Patented Mar. 5, 1935

1,993,290

UNITED STATES PATENT OFFICE 1,993,290

METHOD OF MAKING CELLULAR RUBBER

Douglas Frank Twiss, Wylde Greene, Birmingham, and William McCowan, Kings Heath, Birmingham, England, assignors to Dunlop Rubber Company, Limited, London, England, a British company No Drawing. Application March 2, 1934, Serial No. 713,688. In Great Britain March 16, 1933

10 Claims. (Cl. 18—53)

This invention comprises improvements in or relating to the manufacture of goods of rubber or similar material and is particularly concerned with the manufacture of rubber or similar material of sponge-like or cellular structure from aqueous emulsions or dispersions of rubber of the kinds specified hereinafter.

The object of the present invention is to provide an improved and simple method for the production of rubber or similar material of a sponge-like or cellular structure direct from aqueous emulsions or dispersions thereof.

According to the present invention, the method for the production of goods of rubber or similar material of sponge-like or cellular emulsions or dispersions of the kinds hereinafter specified comprises solidifying the aqueous emulsions or dispersions aforesaid by subjecting the aforesaid emulsions or dispersions to low temperatures and subsequently vulcanizing the solidified product under such conditions that evaporation of the liquid contained or re-formed therein is prevented.

To the aqueous emulsions or dispersions aforesaid can be added if desired a proportion of a water-soluble coagulant in a quantity insufficient to bring about coagulation at ordinary temperatures, or in such proportion as to have a delayed coagulating or gelling action at ordinary temperatures.

In subjecting the aqueous emulsions or dispersions aforesaid to such low temperatures that solidification of the emulsions or dispersions aforesaid takes place the rubber forms a network throughout the frozen mass.

Where aqueous emulsions or dispersions are employed containing an insufficient proportion of coagulant to cause coagulation at ordinary temperatures during the freezing operation it would seem that separation of ice raises the concentration of the water-soluble substances present including any added coagulant so that coagulation of the aqueous emulsions or dispersions aforesaid accompanies freezing.

The solidifying or freezing operation is preferably carried out in a mould of desired shape, and the vulcanization operation is also preferably carried out while the rubber mixture is still in the mould.

Agitation may be restorted to during the early stages of the freezing operation. The freezing operation also may be expedited and the final texture of the sponge product may be adjusted and modified by the addition of finely crushed ice or snow for example in place of water for dilution to give the desired ultimate density. The latter adjustment may also be effected by the addition of fragments of other easily liquefiable solids such as of swollen reversible hydrophilic colloids e. g. gelatine or of collapsible solids such as silicic acid jelly which on eventual loss of water shrink greatly in volume.

The density of the final vulcanized sponge or cellular rubber material can be altered by mere adjustment of the concentration or dilution of the original rubber dispersion and/or of the proportion of added easily liquefiable or collapsible solids.

The entrained water in the vulcanized sponge rubber produced is preferably removed after vulcanization by pressing or centrifuging, with or without a washing operation or operations followed by drying.

The emulsion or dispersions of rubber or the like comprise those consisting of rubber, guttapercha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in Patent No. 1,846,164 and in British Patent No. 219,635 to which may be added any one or more of the usual known compounding ingredients may also be employed.

Examples of substances which can be used for accelerating the coagulation of the aforesaid dispersions when subjected to low temperatures are sodium or potassium silicofluoride, calcium chloride, magnesium sulphate and zinc sulphate.

The following examples illustrate how the method according to the present invention can be effected:—

Example 1

A 60% concentrated latex obtained by centrifugal action is compounded so as to have the following composition:—

|  | Parts by weight |
|---|---|
| Rubber (in the form of latex) | 50 |
| Sulphur | 2 |
| Zinc diethyldithiocarbamate | 0.5 |
| Zinc oxide | 2 |
| Gelatine | 1 |
| Calcium chloride | 0.1 |
| Additional water | 100 |

The calcium chloride is introduced in the form of a 1% aqueous solution. The gelatine is also added in the form of an aqueous solution.

The latex mixing enclosed in a metal container is then subjected to complete freezing in a bath at approximately −10° C. The container with its solidified contents is then immersed in boiling water for two hours. The cylinder is then opened and the vulcanized reticular rubber mass produced is then washed, squeezed and dried.

Example 2

A latex mixing is prepared from a 60% concentrated latex obtained by centrifugal action to have the following composition:—

| | Parts by weight |
|---|---|
| Rubber (in the form of latex) | 50 |
| Sulphur | 2 |
| Zinc diethyldithiocarbamate | 0.5 |
| Zinc oxide | 2 |
| Gelatine | 2 |
| Additional water | 25 |

To this latex mixing is added with stirring about 100 parts of finely crushed ice. The mixture is then enclosed in a mould of desired shape and frozen completely in a bath at approximately −10° C. The mould with its contents is then immersed in boiling water for two hours. The vulcanized reticular mass produced is then washed, drained and dried.

The sponge rubber produced according to this example has a coarser structure than that produced according to Example 1 and resembles closely the structure of natural sponge.

Example 3

A latex mixing is prepared from a 60% concentrated latex to have the following composition:—

| | Parts by weight |
|---|---|
| Rubber (in the form of latex) | 50 |
| Sulphur | 0.5 |
| Zinc diethyldithiocarbamate | 0.75 |
| Zinc oxide | 4 |
| Additional water | 10 |
| Finely crushed ice approx. | 350 |

This is frozen and vulcanized as in the previous example and gives a sponge product of similar character, but of lighter texture.

Having now particularly described our said invention, we claim:—

1. A method for the production of goods of rubber or similar material of sponge-like or cellular structure from aqueous emulsions or dispersions which comprises solidifying the aqueous emulsions or dispersions aforesaid by subjecting the aforesaid emulsions or dispersions to low temperatures and subsequently vulcanizing the solidified product above the melting point of the aqueous medium under such conditions that evaporation of the liquid contained therein is prevented.

2. A method as claimed in claim 1, wherein to the aqueous emulsions or dispersions aforesaid is added a proportion of a water-soluble coagulant in a quantity insufficient to bring about rapid coagulation at ordinary temperatures.

3. A method as claimed in claim 1, wherein the solidifying or freezing operation is carried out in a mould of desired shape.

4. A method as claimed in claim 1, wherein the vulcanization operation is carried out while the rubber mixture is still in the mould.

5. A method as claimed in claim 1, wherein agitation is resorted to during the early stages of the freezing operation.

6. A method as claimed in claim 1, wherein finely crushed ice or snow is added to the aqueous emulsions or dispersions aforesaid.

7. A method as claimed in claim 1, wherein easily liquefiable solids such as swollen reversible hydrophilic colloids are added to the aqueous emulsions or dispersions aforesaid.

8. A method as claimed in claim 1, wherein collapsible solids are added to the aqueous emulsions or dispersions aforesaid.

9. A method as claimed in claim 1, wherein the entrained water in the vulcanized sponge rubber produced is removed by pressing or centrifuging with or without a washing operation or operations, followed by drying.

10. A method for producing goods of cellular structure which comprises freezing an aqueous dispersion of material comprising rubber and vulcanizing reagents in a predetermined form, then heating the solidified structure at a vulcanizing temperature while retaining the water of the dispersion within the structure formed by freezing said dispersion.

DOUGLAS FRANK TWISS.
WILLIAM McCOWAN.